US008270762B1

(12) United States Patent
Abel

(10) Patent No.: US 8,270,762 B1
(45) Date of Patent: Sep. 18, 2012

(54) AUTOMATED LIGHT-LINE CALIBRATION SYSTEM AND METHOD OF CALIBRATING AN OPTICAL FIBER LIGHT LINE ASSEMBLY

(75) Inventor: Robert E. Abel, Fiskdale, MA (US)

(73) Assignee: Schott Corporation, Elmsford, NY (US)

( * ) Notice: Subject to any disclaimer, the term of this patent is extended or adjusted under 35 U.S.C. 154(b) by 565 days.

(21) Appl. No.: 12/460,368

(22) Filed: Jul. 18, 2009

Related U.S. Application Data

(60) Provisional application No. 61/194,314, filed on Sep. 27, 2008.

(51) Int. Cl.
*G06K 9/20* (2006.01)
*G06K 9/00* (2006.01)
*H04N 13/02* (2006.01)
*H04N 5/00* (2011.01)

(52) U.S. Cl. ........... 382/282; 382/128; 348/48; 348/615

(58) Field of Classification Search .............. 382/128, 382/199, 254, 265, 267, 275, 299, 288; 348/48, 348/615, 284, 117
See application file for complete search history.

(56) References Cited

U.S. PATENT DOCUMENTS

| | | | | |
|---|---|---|---|---|
| 5,018,509 A | * | 5/1991 | Suzuki et al. | 600/115 |
| 6,157,748 A | * | 12/2000 | Taleblou et al. | 382/288 |
| 6,885,801 B1 | * | 4/2005 | Shankar et al. | 385/117 |
| 6,985,612 B2 | * | 1/2006 | Hahn | 382/128 |
| 7,110,683 B2 | * | 9/2006 | Bessios | 398/208 |
| 2005/0207668 A1 | * | 9/2005 | Perchant et al. | 382/254 |

* cited by examiner

*Primary Examiner* — Vu Le
*Assistant Examiner* — Andrae S Allison
(74) *Attorney, Agent, or Firm* — Louis J. Franco; Law Office of Louis J. Franco

(57) ABSTRACT

A method of calibrating the intensity with which light is emitted through the light-emission face of an optical fiber light line assembly employs (i) a data processing system with computer memory, (ii) a camera communicatively linked to the data processing system, and (iii) a signal-responsive scoring device communicatively linked to the data processing system. Light is introduced into the assembly, an image of the emitting face is captured, and corresponding image data is stored in computer memory. The image data is segmented into plural image-data segments corresponding to physical sub-regions of the imaged face. The image-data segments are algorithmically analyzed to identify the sub-region that emits inputted light with the lowest intensity, and emission-intensity data associated with that sub-region is identified as reference emission data. Comparative analysis of the image-data segments identifies "non-compliant" sub-regions that emit light with unacceptably high intensity in accordance with a pre-established parameter set. The data processing system issues scoring signals that cause the scoring device to score each non-compliant sub-region until that sub-region emits light with acceptable average intensity.

17 Claims, 4 Drawing Sheets

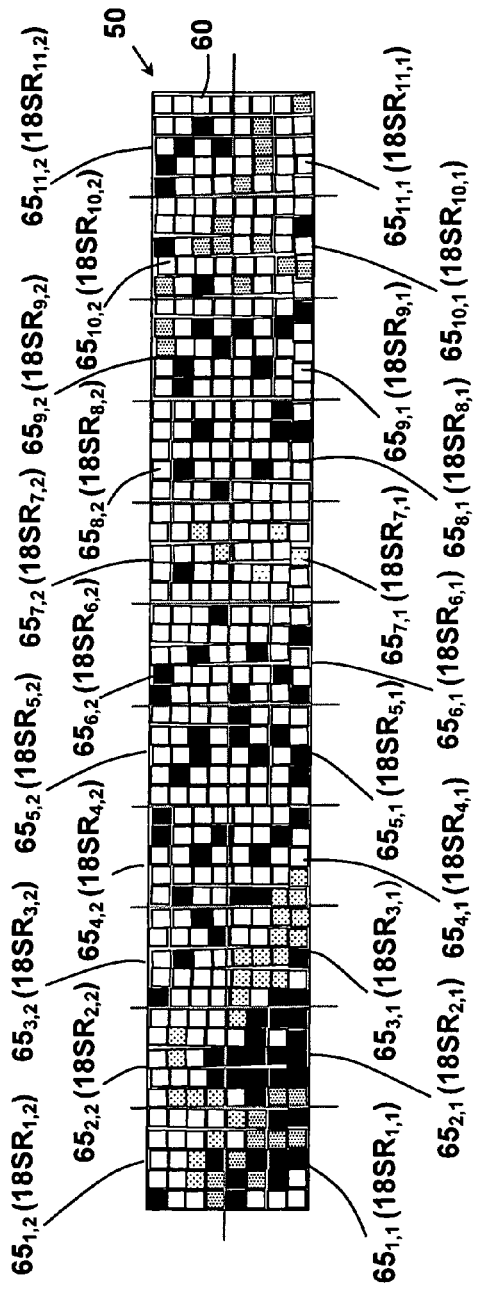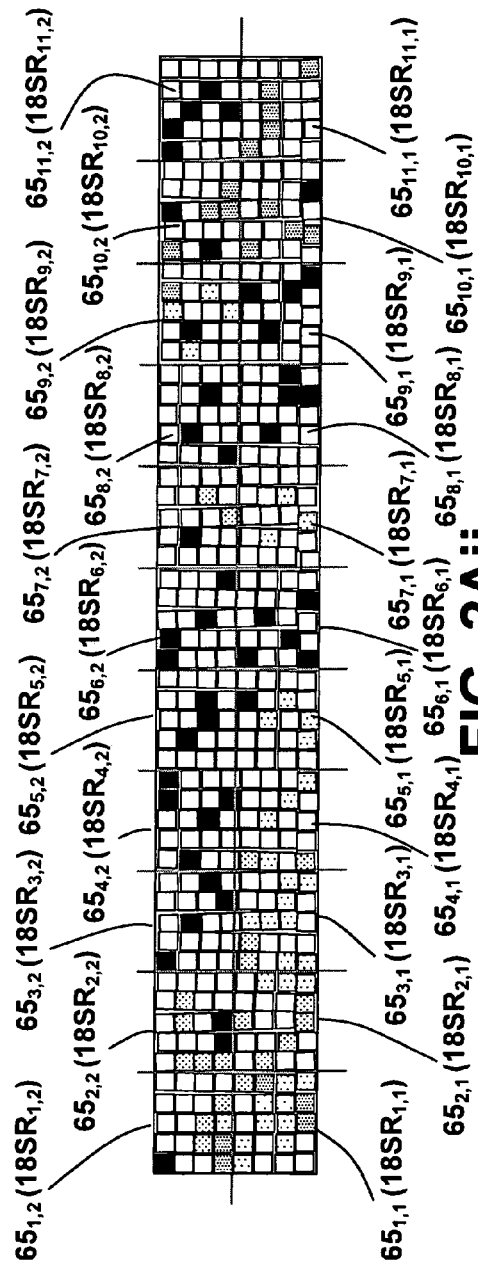

| Image-data Segment | Initial Normalized Numeric Intensity Value |
|---|---|
| $65_{1,1}$ $T_S$ | 1.60 |
| $65_{2,1}$ $T_S$ | 1.88 |
| $65_{3,1}$ $T_S$ | 1.37 |
| $65_{4,1}$ $T_S$ | 1.32 |
| $65_{5,1}$ $T_S$ | 1.30 |
| $65_{6,1}$ | 1.25 |
| $65_{7,1}$ | 1.00 = $V_{ER}$ |
| $65_{8,1}$ | 1.20 |
| $65_{9,1}$ | 1.20 |
| $65_{10,1}$ | 1.10 |
| $65_{11,1}$ | 1.04 |
| $65_{1,2}$ | 1.22 |
| $65_{2,2}$ | 1.18 |
| $65_{3,2}$ | 1.20 |
| $65_{4,2}$ | 1.25 |
| $65_{5,2}$ | 1.15 |
| $65_{6,2}$ | 1.20 |
| $65_{7,2}$ | 1.09 |
| $65_{8,2}$ | 1.15 |
| $65_{9,2}$ $T_S$ | 1.26 |
| $65_{10,2}$ | 1.22 |
| $65_{11,2}$ | 1.25 |
|  |  |

FIG. 2Bi

| Image-data Segment | Final Normalized Numeric Emission Value |
|---|---|
| *$65_{1,1}$* | *1.25* |
| *$65_{2,1}$* | *1.18* |
| *$65_{3,1}$* | *1.17* |
| *$65_{4,1}$* | *1.14* |
| *$65_{5,1}$* | *1.13* |
| $65_{6,1}$ | 1.25 |
| $65_{7,1}$ | 1.00 = $V_{ER}$ |
| $65_{8,1}$ | 1.20 |
| $65_{9,1}$ | 1.20 |
| $65_{10,1}$ | 1.10 |
| $65_{11,1}$ | 1.04 |
| $65_{1,2}$ | 1.22 |
| $65_{2,2}$ | 1.18 |
| $65_{3,2}$ | 1.20 |
| $65_{4,2}$ | 1.25 |
| $65_{5,2}$ | 1.15 |
| $65_{6,2}$ | 1.20 |
| $65_{7,2}$ | 1.09 |
| $65_{8,2}$ | 1.15 |
| *$65_{9,2}$* | *1.16* |
| $65_{10,2}$ | 1.22 |
| $65_{11,2}$ | 1.25 |
|  |  |

FIG. 2Bii

AUTOMATED LIGHT-LINE CALIBRATION SYSTEM AND METHOD OF CALIBRATING AN OPTICAL FIBER LIGHT LINE ASSEMBLY

PROVISIONAL PRIORITY CLAIM

Priority based on Provisional Application Ser. No. 61/194,314 filed Sep. 27, 2008, and entitled "AUTOMATED LIGHT-LINE CALIBRATION SYSTEM AND METHOD OF CALIBRATING AN OPTICAL FIBER LIGHT LINE ASSEMBLY" is claimed. The entirety of the disclosure of the previous provisional application, including the drawings, is incorporated herein by reference as if set forth fully in the present application.

BACKGROUND

A light line is an assembly of illuminating optical devices combined to project a uniform, thin line of light onto an object for line scan applications. A first type of light line device includes a plurality of linearly-arranged, separately illuminable light-emitting devices such as, by way of example, a one-dimensional, elongated array of light-emitting diodes (LEDs). A second type of light line includes a plurality of flexible optical fibers, each of which optical fibers includes opposed light-input and light-output ends. In order to form a light line, the light-output ends of the optical fibers are mechanically bound to one another to form a light-emitting face that is elongated along one dimension.

One advantage of a light line formed from flexible optical fibers is that the light-input ends of the fibers can be fed back to a single light source located remotely from the light-emitting light-line face, and more easily accessed when required. However, as with LED-based light lines, attendant to the use of optical fiber light lines is the issue of non-uniform illumination intensity at the light-emitting face. More specifically, disparate regions of equal area along the light-emitting face may illuminate with disparate intensities. There are two principal reasons for disparate illumination in an optical fiber light line. First, because the light-output ends of the constituent flexible fibers are simply grouped and bound to form the light-emitting face, any two regions of equal area along the face may include different numbers of fibers. Stated alternatively, the fiber-packing density may vary over the surface of the light-emitting face. Second, the constituent fibers may be disparately tilted relative to an illumination plane parallel to the light-emitting face. Even if every constituent fiber emits light over the same numerical aperture, a fiber whose light-emitting end is not orthogonal to the illumination plane will illuminate more dimly along an axis normal to the illumination plane than will a fiber whose light-emitting end is orthogonal to the illumination plane. Persons acquainted with the fabrication and use of light lines refer to regions of a light-emitting face that illuminate relatively brightly as "hot spots." Hot spots are generally regarded as an undesirable attribute of optical fiber light lines. Accordingly, techniques have been developed for "calibrating" a light line. "Calibration" in this context refers to reducing the light-emission intensity of the most brightly illuminating fibers down to within an acceptable percentage difference in illumination of the most dimly illuminating constituent fibers.

One existing technique for reducing hot spots to improve light-emission uniformity over the face of a light line involves the mechanical scoring of bright regions. As part of this technique, an operator of a "calibration station" causes light to emit through the light-emitting face of the light line while capturing images of various regions of the light-emitting face with a camera linked to a data processing system. The captured images include "mapping data" representative of various regions of the actual light-emitting face and an indication as to relative illumination intensity. Using the captured images and associated region address and intensity information as a guide, the operator manually scores unacceptably bright regions with a scoring device (e.g., a scribe) in order to dim them. This technique has met with various difficulties. One problem is the scale on which the scoring must frequently be conducted; some of the bright regions are nearly or actually microscopic such that restricting the tip of the scribe to the confines of the bright region is extremely difficult at best. Accordingly, "collateral damage" to areas surrounding the bright region being scored is frequently encountered. Another difficulty is caused by inconsistent application of force to the scribe, such that bright regions are scored too deeply, thereby imparting irreparable damage to the light-emitting face. A still additional drawback of the current technique is that it requires the operator of the calibration station to manually move the camera with respect to the light line being inspected and calibrated in order to capture the various images. This manual movement is inefficient, and worse, introduces imprecision that may cause entire regions to go non-imaged and uncalibrated.

Accordingly, a need exists for an automated method of light-line calibration that reduces the inefficiencies and imprecision associated with manual calibration.

SUMMARY

Implementations of the present invention are generally directed to a method of calibrating the light-emission intensity of an optical fiber light line assembly including a plurality of constituent optical fibers with light-input ends through which light is introduced into the optical fibers and light-output ends including light-output faces mutually bound to define a light-line light-emission face through which light is emitted. Various implementations of the method are facilitated through the provision of light-light calibration apparatus including a (i) data processing system with an associated computer memory, (ii) a camera communicatively linked to the data processing system, and (iii) a signal-responsive scoring device that is communicatively linked to the data processing system and mechanically responsive to scoring signals (instructions) communicated thereto by the data processing system.

In accordance with an illustrative implementation, the light-line light-emission face is secured in a fixed position and light is caused to emit from the light-emission face by introducing light as uniformly as practicable into the light-input ends of the constituent optical fibers. With the positionally fixed light-emission face emitting light, an image of a region of the light-emission face is captured and image data representative of that image is stored in the computer memory. In various versions, the "region" of which an image is acquired comprises the entire emitting surface of the light-emission face. The image data includes information indicative of the intensity with which the inputted light is emitted through various regions of the light-emission face.

Analysis of the captured image includes segmenting the image data into plural (i.e., at least two) image-data segments, each of which image-data segments corresponds to a physical sub-region of the imaged region of the light-emission face. In a broadly illustrative implementation, each sub-region to which an image-data segment corresponds comprises the light-output face of at least one constituent optical fiber. As a practical matter, however, each sub-region will include a plurality of light-output faces. Moreover, in various versions, the image-data segments correspond as closely as practicable to sub-regions of equal area, irrespective of variations in fiber density among the sub-regions. This latter aspect may be alternatively indicated as segmenting the image-data into image-data segments corresponding to sub-regions of "approximately equal" area since segmenting to correspond to sub-regions of exactly equal area is rarely, if ever, practicable.

Each image-data segment is analyzed and data indicative of the intensity with which light is emitted through the sub-region to which that image-data segment corresponds, relative to the intensity with which light is emitted through at least one other sub-region, is associated with that image-data segment in computer memory. For example, a numeric value indicative of average emission intensity, relative to other sub-regions, may be associated with the image-data segment corresponding to each imaged sub-region of the light-emission face. Moreover, because the principal objective of various implementations of the calibration method is to obviate unacceptably disparate emission intensities among the sub-regions of the light-emission face, the image-data segments are algorithmically analyzed in order to indentify the sub-region of the light-emission face through which light is emitted with the lowest emission intensity, and emission-intensity data associated with that sub-region is identified as reference emission data.

With the emission-intensity data associated with the "most dimly emitting" sub-region available as a reference, analysis algorithms identify "non-compliant sub-regions." "Non-compliant sub-regions" are those sub-regions that emit light with unacceptably high intensity, relative to the reference sub-region, in accordance with certain parameters included in, for example, a pre-established parameter set. For example, in accordance with various implementations, a maximum intensity-deviation value is pre-established and stored in computer memory. The maximum intensity-deviation value is indicative of an amount by which the average emission intensity with which light is emitted in the sub-region through which light is emitted with the highest average emission intensity can exceed the average emission intensity with which light is emitted in the sub-region through which light is emitted with the lowest average emission intensity (i.e., the reference sub-region).

In various implementations in which a parameter such as a maximum intensity-deviation value has been established, a sub-region-specific emission-intensity deviation is calculated in association with each sub-region other than the reference sub-region. Each emission-intensity deviation is indicative of an amount by which the emission intensity (e.g., average emission intensity) in the sub-region with which that calculated deviation is associated differs from the emission intensity in the reference sub-region. Comparative analysis is conducted in order to identify each sub-region through which light is emitted with an intensity exceeding the maximum intensity-deviation value, and such sub-regions are variously regarded as non-compliant.

Regardless of the particular manner in which non-compliant sub-regions are identified in various implements, with respect to each such non-compliant sub-region, the data-processing system is caused to produce and communicate (render) to the scoring device a set of scoring signals instructing the scoring device to score each non-compliant sub-region until that sub-region is compliant (i.e., emits light with acceptable intensity relative to the reference sub-region).

Representative, non-limiting implementations are more completely described and depicted in the following detailed description and the accompanying drawings.

BRIEF DESCRIPTION OF THE DRAWINGS

FIG. 2Ai is a graphical representation of an image-data record associated with the initial imaging of the light-emission face of the light line assembly of FIGS. 1 and 2 prior to calibration, and including image-data segments corresponding to physical sub-regions of the imaged light-emission face;

FIG. 2Aii is a graphical representation of an image-data record associated with the imaging of the light-emission face of the light line assembly of FIGS. 1 and 2 after automated calibration;

FIG. 2Bi is an emission-data table identifying the image-data segments graphically depicted in FIG. 2Ai and associating with each image-data segment a numeric emission value indicative of the average intensity with which light is emitted through the physical sub-region to which that image-data segment corresponds; and FIG. 2Bii is an emission-data table identifying the image-data segments graphically depicted in FIG. 2Aii and associating with each image-data segment a numeric emission value indicative of the average intensity with which light is emitted through the physical sub-region to which that image-data segment corresponds.

DETAILED DESCRIPTION

The following description of an automated line light calibration system and of associated processes, architecture, and implementations thereof, is demonstrative in nature and is not intended to limit the invention or its application of uses.

Figure 1:
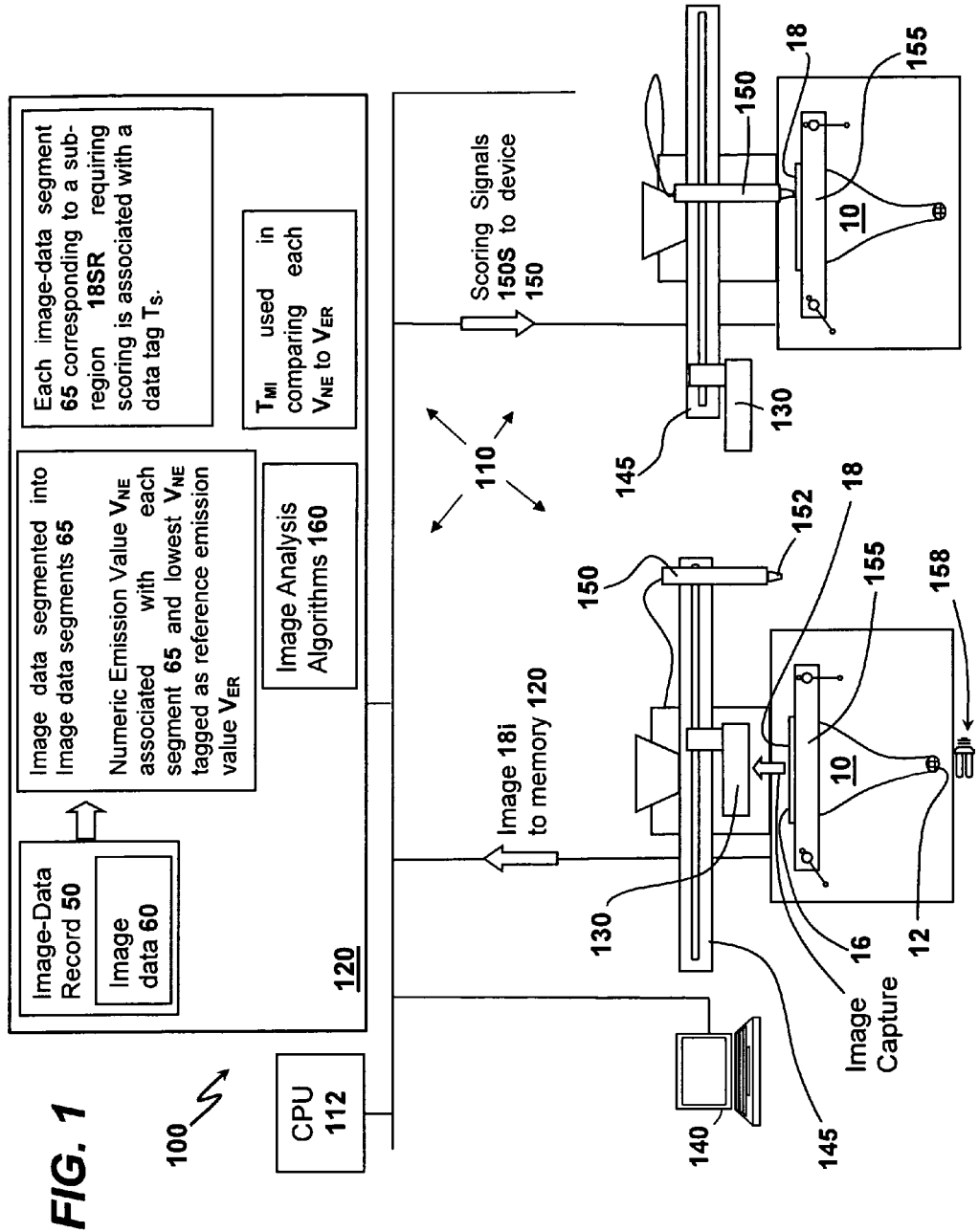
FIG. 1 is an architectural schematic of an illustrative light line calibration system and a light line assembly to be calibrated by the calibration system.

Referring to the schematic of FIG. 1, an illustrative automated light line calibration system 100 is configured for "calibrating" the intensity with which light is emitted from an optical fiber light line assembly 10. The illustrative light line assembly 10 shown as the "work piece" to be calibrated in FIG. 1, and in isolation in FIG. 2, includes a light-acceptance end 12 and an opposed light-emission end 16. Extending between the light-acceptance and light-emission ends 12 and 16 is a plurality of flexible, constituent optical fibers 20. Each optical fiber 20 includes a light-input end 22 with a light-input face 24 and a light-output end 26 with a light-output face 28 opposite the light-input face 24. The light-output ends 26 of the plural optical fibers 20 are mutually bound such that the light-output faces 28 define a light-line light-emission face 18 at the light-emission end 16 of the light line assembly 10. It will be appreciated that, while the light-output faces 28 are mutually bound to coincide with and define a single light-line light-emission face 18, the flexible optical fibers 20 may be "drawn back" and bundled in groups such that the light-input ends 22 of the fibers 20 in each group define a light-acceptance end 12. In other words, the light line assembly 10, while having a single light-emission face 18, can have multiple light-acceptance ends 12, each of which light-acceptance ends 12 is defined by bundled optical fibers 20. Persons acquainted with the optical fiber assembly arts will appreciate that multiple light-input ends 12 may be necessary in order to form a large-format light-emission face 18. It will also be appreciated that a light line assembly 10 of the type described above is, in essence, a flexible optical fiber bundle in which the light-output faces 28 of the constituent optical fibers 20 are arranged to form an elongated, selectively illuminable strip. Accordingly, while a light line calibration system, such as calibration system 100, may be used to calibrate light-emission intensity from a light line, it is not so limited in its implementation; it may be used to calibrate light-emission intensity from variously configured optical fiber bundles.

Referring again to FIG. 1, the illustrative calibration system 100 includes a data processing system 110 with a central processing unit (CPU) 112 that is communicatively linked to an associated computer memory 120. An image-input device 130 (e.g., a camera) is communicatively linked to the data processing system 110 such that images of a light line assembly 10 can be captured and stored in the computer memory 120. Additionally, the calibration system 100 includes a computer-controllable scoring device 150 communicatively linked to the data processing system 110, and mechanically responsive to instructions programmed into the data processing system 110. A machine-human interface 140 communicatively linked to the data processing system 110 allows a human operator to control certain parameters of the calibration process and to view readouts indicative of set parameters, completed process steps, and images. Accordingly, the machine-human interface 140 of various versions includes a monitor and keyboard, mouse and/or touchscreen for the inputting of process commands. In the illustrative version depicted in FIG. 1, the machine-human interface 140 is a lap-top computer. For purposes of explaining various details of the functionality and interrelatedness of the architectural components of an illustrative light line calibration system 100, consideration is given below to an illustrative light-emission calibration process relative to the light line assembly 10.

Figure 2:
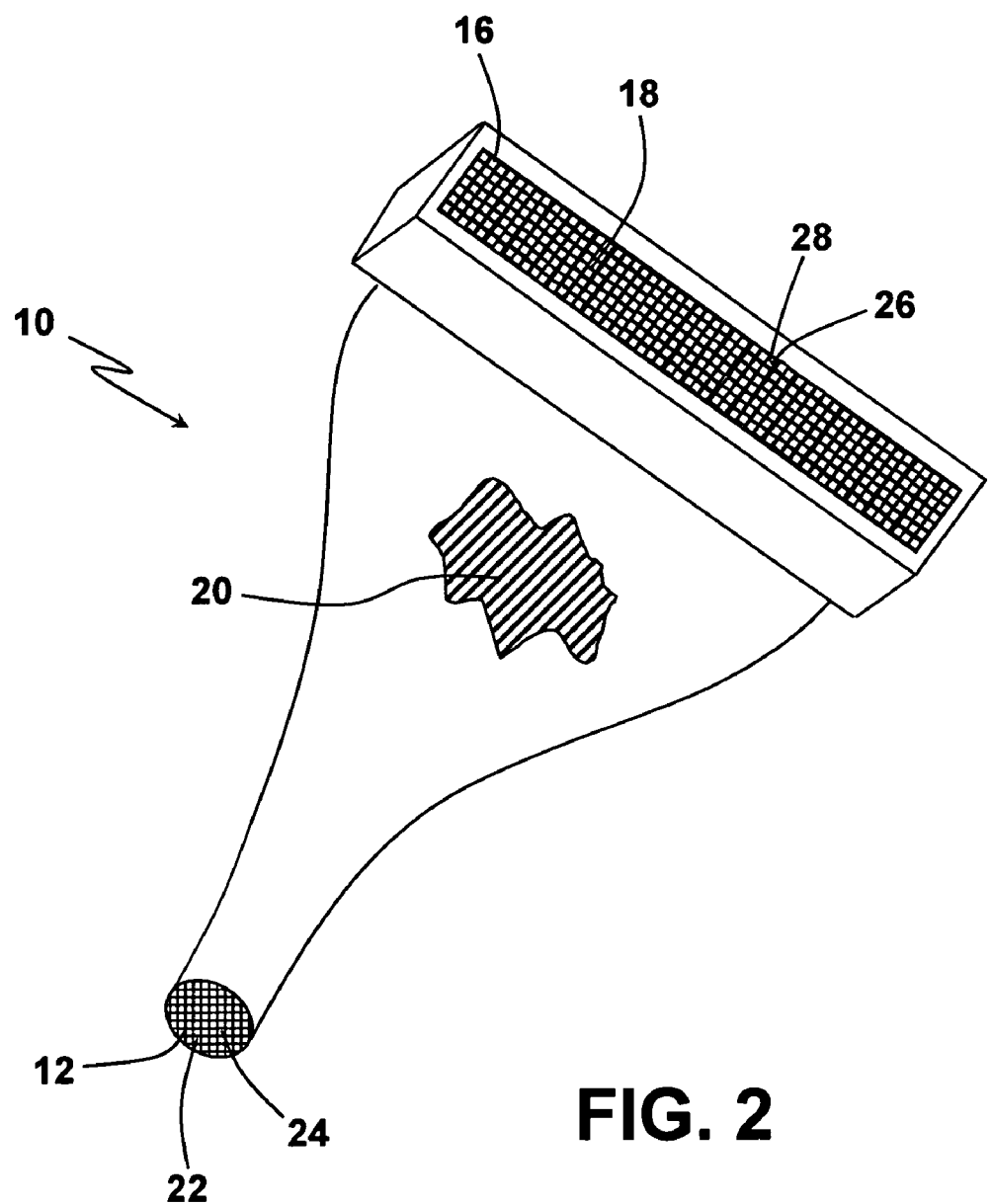
FIG. 2 is a enlarged view of the light line assembly shown in FIG. 1 showing the light-emission face to be calibrated.

Referring still to FIG. 1, the light-emission face 18 of the light line assembly 10 is temporarily secured in a fixed position. The manner or apparatus by which the light-emission face 18 is secured is of no particular relevance. In the illustrative case of FIG. 1, the light line assembly 10 is retained by a generic vise 155. As shown in FIGS. 1 and 2, light is introduced into the light-input faces 24 of the constituent optical fibers 20 such that light is emitted through the light-output faces 28 defining the light-line light-emission face 18. It is important that light be introduced into the plural light-input faces 24 as uniformly as practicable since, as indicated in the summary, the goal of the calibration procedure is to ensure uniformity of light emission from the light-emission face 18 based on a uniform input. Although the light line assembly 10 can, and in some cases must, include multiple light-acceptance ends 12, it will be appreciated that ensuring uniformity of light input will typically be simplified when a single light source 158 is used to introduce light into a light line assembly 10 with a single light-acceptance end 12. For purposes of simplified explanation, the illustrative light line assembly 10 under consideration is configured with a single light-acceptance end 12 of relatively small cross-sectional area.

As light is shone uniformly into the light-acceptance end 12 of the light line assembly 10, light emits through the light-emission face 18. With light emitting from the light-emission face 18, the image-input device 130 is caused to acquire (or "capture") at least one image 18i of at least one region 18R of the light-emission face 18. For the sake of simplifying the description, it is assumed that the region 18R is the entire light-emission face 18, captured in a single image 18i with the image-input device 130 stationary relative to the light-emission face 18. It will be appreciated, however, that in some versions, the image-input device 130 will be moved relative to the light-emission face 18 in order to acquire a continuous stream of image data to acquire multiple images 18i representing disparate regions 18R of the light-emission face 18. In any event, an image-data record 50 representative of each acquired image 18i is stored in computer memory 120. Each image-data record 50 includes image data 60 from which locations along the imaged light-emission face 18, and corresponding relative emission intensities, can be ascertained and, for example, "mapped" to associate identifiable locations along the light-emission face 18 with relative emission intensities.

FIG. 2Ai is a graphical representation of an image-data record 50 associated with the initial imaging (i.e., prior to calibration) of the light-emission face 18. As explained in the background and summary, prior to calibration, light frequently emits from the light-emission face 18 of a light line assembly 10 non-uniformly, despite uniform acceptance of light among light-input faces 24 of the constituent optical fibers 20. In the image-data record 50 graphically depicted in FIG. 2Ai, non-uniform light emission is indicated by variations in the appearance of disparate areas within the graphically-depicted image-data 60. More specifically, for illustrative purposes, the solid white areas of the graphically-represented image data 60 are deemed to correspond to light-output faces 28 that emit light with the lowest relative intensity, while solid black areas correspond to light-output faces 28 that emit with the highest relative intensity. Variously patterned (e.g., dotted and hashed) areas correspond to light-output faces 28 that emit with varying intensities between the lowest and highest emission intensities represented by, respectively, the aforementioned white and black areas. Although the illustrative graphic of FIG. 2Ai indicates that the acquired image 18i is resolvable down to individual light-output faces 28, it is to be understood that this has been done for illustrative purposes; more typically, individual light-emission faces 28 are not resolvable and the image data 60 in an image-data record 50 is analyzed in portions corresponding to areas along the physical light-emission face 18 defined by multiple light-output faces 28, as explained in greater detail below.

Referring to FIGS. 1 and 2Ai, image data 60 in the image-data record 50 are segmented into image-data segments 65. Each image data segment 65 corresponds to a physical sub-region 18SR of the imaged region 18R of the light-emission face 18. Moreover, while each sub-region 18SR could be defined so as to comprise the light-output face 28 of a single constituent optical fiber 20, as previously mentioned, individual light-output faces 28 are not typically resolvable. Accordingly, each sub-region 18SR typically comprises the light-output faces 28 of multiple optical fibers 20. In one version, the sub-regions 18SR are defined as sub-portions of approximately equal area along the imaged region 18R of the light-emission face 18, irrespective of variations in fiber count (e.g., density) among the sub-regions 18SR. In the graphical representation of image data 60 in FIG. 2Ai, the light-emission face 18 is mapped so as to define twenty two image-data segments $65_{1,1}$ through $65_{11,2}$ corresponding respectively to twenty two sub-regions $18SR_{1,1}$ through $18SR_{11,2}$ on the light-emission face 18. Because the physical sub-regions 18SR are not actually shown, the reference number indicative of the specific sub-region 18SR to which each image-data segment 65 corresponds is shown in parenthesis adjacent the reference number indicating each image-data segment 65. The sub-scripted numeric portion of the reference numbers associated with individual image-data segments 65, and the sub-regions 18SR to which they correspond, indicate that an address tag is associated in the computer memory 120 with each image-data segment 65. In the illustrative example of FIG. 2Ai, the address tag associated with each image-data segment 65 is indicative of a two-dimensional spatial location of the physical sub-region 18SR to which that address-tagged image-data segment 65 corresponds. More specifically, in the non-limiting example of FIG. 2Ai, the mapped data is configured such that the bottom left-hand corner of the imaged light-emission face 18 corresponds to the origin of a Cartesian coordinate system. There are two rows of graphically-represented image-data segments 65, a first in which every image-data segment 65 has a Y-axis position of 1 and a second in which every image-data segment has a Y-axis position of 2. In each of the first and second rows, there are eleven (11) image-data segments 65 with X-axis positions numbering 1 through 11. Accordingly, the image-data segment $65_{1,1}$ located at the bottom left of the image has an X-axis position of 1 and a Y-axis position of 1. At the other extreme, the image-data segment $65_{11,2}$ has an X-axis position of 11 and a Y-axis position of 2. Although a two-dimensional array of image-data segments 65 is shown for illustrative purposes, it is to be understood that within the scope and contemplation of the invention are versions in which the image data 60 is segmented such that the image-data segments 65 correspond to physical sub-regions 18SR extending along only a single dimension within the imaged region 18R of the light-emission face 18.

In alternative implementations, each image-data segment 65 of the image-data 60 is algorithmically analyzed by an image analysis algorithm 160 in order to quantify light-emission characteristics associated with each image-data segment 65. In one illustrative version, each image-data segment 65 is analyzed in order to associate with that image-data segment 65, in computer memory 120, a numeric emission value $V_{NE}$ indicative of the average intensity with which light is emitted through the physical sub-region 18SR to which that image-data segment 65 corresponds relative to the intensity with which light is emitted through at least one other sub-region 18SR within the imaged region 18R of the light-emission face 18. In various versions, the algorithmic analysis includes a determination as to the identity of the image-data segment 65 that corresponds to the sub-region 18SR of the light-emission face 18 through which light is emitted with the lowest average emission intensity. Once the image-data segment 65 associated with the sub-region 18SR exhibiting the lowest average emission intensity is identified, the numeric emission value $V_{NE}$ associated with that image-data segment 65 has associated with it a data tag indentifying it as a reference-emission value $V_{ER}$ against which the emission values $V_{NE}$ associated with other image-data segments 65 are algorithmically compared.

Referring to FIG. 2Bi, an emission-data table identifies each image-data segment 65 and an associated, algorithmically determined numeric emission value $V_{NE}$. The numeric emission values $V_{NE}$ in FIG. 2Bi correspond to the image-data segments 65 in the graphically-depicted image-data record 50 of FIG. 1 and associated with the initial imaging (i.e., prior to calibration) of the light-emission face 18. In this particular, non-limiting example, the numeric emission values $V_{NE}$ are normalized such that the image-data segment 65 corresponding to the sub-region 18SR through which light is emitted with the lowest average intensity (i.e., image-data segment $65_{7,0}$) has been assigned a numeric emission value $V_{NE}$ of 1.00 and, as previously stated, is identified as the reference-emission value $V_{ER}$. As previously explained, the reference-emission value $V_{ER}$ is the value to which the numeric emission value $V_{NE}$ associated with each of the other image-data segments 65 is compared. The algorithmic comparison of the reference-emission value $V_{ER}$ to each of the other numeric emission values $V_{NE}$ provides a basis for identifying which sub-regions 18SR of the light-emission face 18 require scoring in order to reduce the average intensity with which they emit light. More specifically, in various implementations, a maximum-intensity threshold $T_{MI}$ is pre-established and stored in computer memory 120. The maximum-intensity threshold $T_{MI}$—alternatively referred to as "maximum intensity-deviation value"—is indicative of an amount by which the average emission intensity with which light is emitted from the most intensely emitting sub-region 18SR can exceed the average emission intensity with which light is emitted through the sub-region 18SR from which light is emitted with the lowest average intensity. In a typical version, the maximum permissible deviation in emission from the reference-emission value $V_{ER}$ is adjustable by a human operator of the calibration system 100. For instance, a user may be able to indicate through the human-machine interface 140 that the maximum allowable variance in emission intensity between the dimmest and brightest sub-regions 18SR of the light-emission face 18 can be no greater than a certain percentage. In some versions, it is also possible for a user to adjust the area of the sub-regions 18SR that the calibration system 100 analyzes for comparative purposes. It will be appreciated that, while defining a large quantity of small sub-regions 18SR is more computationally intensive than defining a smaller quantity of larger sub-regions 18SR, the end result of the former is statistically more likely to be a more uniformly-emitting light-emission face 18.

For illustrative purposes, a "calibration run" is considered relative to the light line assembly 10 of FIGS. 1 and 2, the graphically represented image-data record 50 of FIG. 2Ai, and the tabulated numeric emission values $V_{NE}$ of FIG. 2Bi. For the purpose of explanation, it is established that any sub-region 18SR corresponding to an image-data segment 65 associated with a numeric emission value $V_{NE}$ of greater than 1.25 emits light with an unacceptably high intensity relative to the sub-region 18SR associated with the reference-emission value $V_{ER}$. That is, in the final light line assembly 10, the maximum by which the numeric emission value $V_{NE}$ associated with any one sub-region 18SR can deviate from the reference-emission value $V_{ER}$ is 0.25. With reference to the data table of FIG. 2Bi, and the established maximum-intensity deviation permissible, there are six sub-regions 18SR that initially emit light with unacceptably high intensity: those associated with image-data segments (i) $65_{1,1}$, (ii) $65_{2,1}$, (iii) $65_{3,1}$, (iv) $65_{4,1}$, (v) $65_{5,1}$, and (vi) $65_{9,2}$. The image-data segment 65 associated with each sub-region 18SR identified as emitting light in excess of the maximum "brightness" allowable is associated with a data tag $T_s$ indicating that the associated sub-region 18SR requires scoring in order to reduce the average emission intensity therethrough.

With respect to each sub-region 18SR identified as emitting too brightly, the data processing system 110 is caused to produce, and communicative to the scoring device 150, a set of scoring signals 150S. The scoring signals 150S instruct the scoring device 150 to score the light-output face 28 of at least one constituent optical fiber 20 within each sub-region 18SR of the light-emission face 18 through which light is emitted with an emission intensity exceeding the maximum-intensity deviation (maximum-intensity threshold $T_{MI}$) permissible until that sub-region 18SR emits light with an average intensity not exceeding the maximum allowable emission intensity. In FIG. 1, the scoring device 150 is shown scoring the light-emission face 18 of the light line assembly 10. That portion of the calibration system 100 including the image-input device 130 and the scoring device 150 is shown in duplicate to facilitate illustration in the image-acquisition mode versus the scoring mode. More specifically, at a first time, depicted on the left, the image-input device 130 is over the light-emission face 18 in order to capture at least one image 18i. At a second time, the relevant apparatus are in a mode shown to the right of the image-acquisition mode. In the second mode, the image-input device has been moved to the left along a support arm 145 and the scoring device 150 is in place over the light-emission face 18 in order to score the same. Typically, the computer-controlled scoring device 150 includes a scoring bit 152 (e.g., diamond tip) that scores the entire area defined by a sub-region 18SR to be scored. In various implementations, the scoring is performed in incremental steps in order to avoid excessive, potentially-damaging scoring. More specifically, the sub-regions 18SR identified as requiring scoring are scored down to a predetermined level and then a new image 18i of the region 18R is acquired and algorithmically analyzed in order to determine which, if any, sub-regions 18SR still require scoring. Scoring and image-acquisition and analysis are conducted in successive iterations until all sub-regions 18SR initially identified as requiring scoring are brought into compliance with the established maximum-intensity threshold $T_{MI}$. Because the scoring produces dust and debris comprised of the material from which the optical fibers 20 are fabricated, cleaning may be required between each iteration of scoring and image-acquisition. Additionally, or alternatively, the light-emission face 18 may be continuously cleaned during scoring by, for example, a flow of gas (e.g., air) directed under pressure over the surface of the light-emission face 18. In various versions, the depth to which the scoring device 150 scores during each iteration is adjustable by entry of an indication through the human-machine interface 140.

Shown in FIGS. 2Aii and 2Bii are, respectively, the graphically-depicted image-data record 50 corresponding to the light-emission face 18 after final scoring and the tabulated algorithmically determined numeric emission value $V_{NE}$ corresponding to each sub-region 18SR after final scoring. For ease of identification, the six numeric emission values $V_{NE}$ that have been reduced by scoring are displayed in italics. Moreover, a comparison of FIGS. 2Ai and 2Aii reveals that most of the "bright spots" or "hot spots" that are represented by black and hashed squares in FIG. 2Ai have been reduced to merely shaded or white squares in FIG. 2Aii in the scored sub-regions 18SR.

The foregoing is considered to be illustrative of the principles of the invention. Furthermore, since modifications and changes to various aspects and implementations will occur to those skilled in the art without departing from the scope and spirit of the invention, it is to be understood that the foregoing does not limit the invention as expressed in the appended claims to the exact constructions, implementations and versions shown and described.

What is claimed is:

1. A method of calibrating the intensity with which light is emitted through the light-emission face of an optical fiber bundle using (i) a data processing system with an associated computer memory, (ii) an image-input device communicatively linked to the data processing system, and (iii) a signal-responsive scoring device that is communicatively linked to the data processing system and mechanically responsive to scoring signals communicated by the data processing system, the method comprising:

causing light to emit from the light-emission face;
  acquiring an image of the emitting light-emission face and storing image data representative of the image in the computer memory;
  segmenting the image data into plural image-data segments corresponding to physical sub-regions of the imaged face;
  analyzing the image-data segments in order to identify the sub-region of the light-emission face through which light is emitted with the lowest emission intensity, and identifying emission-intensity data associated with that sub-region as reference emission data;
  pre-establishing a maximum intensity-deviation value indicative of an amount by which the emission intensity with which light is emitted in the sub-region through which light is emitted with the highest emission intensity can exceed the emission intensity with which light is emitted in the sub-region associated with the reference emission data;
  identifying as non-compliant each sub-region through which light is emitted with an intensity exceeding the maximum intensity-deviation value; and
  causing the scoring device, in response to scoring signals communicated by the data processing system, to score each non-compliant sub-region until that sub-region emits light with an intensity not exceeding the maximum intensity-deviation value.

2. The method of claim 1 wherein the optical fiber bundle is an optical fiber light line assembly including a plurality of constituent optical fibers with light-input ends and opposed light-output ends including light-output faces mutually bound to define the light-emission face.

3. The method of claim 2 wherein light is caused to emit from the light-emission face by introducing light uniformly into the light-input ends of the constituent optical fibers.

4. The method of claim 3 wherein the image data is segmented in accordance with a method the object of which is to have the image-data segments correspond to sub-regions of equal area, irrespective of variations in fiber density among the sub-regions.

5. The method of claim 1 wherein the image data is segmented in accordance with a method the object of which is to have the image-data segments correspond to sub-regions of equal area, irrespective of variations in fiber density among the sub-regions.

6. The method of claim 1 wherein (i) the optical fiber bundle comprises a plurality of constituent optical fibers with light-input ends and opposed light-output ends including light-output faces mutually bound to define the light-emission face and (ii) light is caused to emit from the light-emission face by introducing light uniformly into the light-input ends of the constituent optical fibers.

7. The method of claim 1 wherein a machine-human interface communicatively linked to the data processing system permits a human operator to adjust at least one parameter of the calibration.

8. The method of claim 7 wherein included among the at least one parameter that is adjustable by a human operator is at least one of (i) the area of the sub-region to which each image-data segment corresponds and (ii) the maximum allowable variance in emission intensity between the sub-region associated with the reference emission data and a sub-region other than the sub-region associated with the reference emission data.

9. A method of calibrating the light-emission intensity of an optical fiber light line assembly including a plurality of constituent optical fibers with light-input ends and opposed light-output ends including light-output faces mutually bound to define a light-line light-emission face, the method comprising:

providing (i) a data processing system with an associated computer memory, (ii) a camera communicatively linked to the data processing system, and (iii) a signal-responsive scoring device that is communicatively linked to the data processing system and mechanically responsive to scoring signals communicated by the data processing system;

introducing light uniformly into the light-input ends of the constituent optical fibers such that light is emitted through the light-emission face;

capturing an image of the emitting light-emission face and storing image data representative of the image in the computer memory;

segmenting the image data into at least two image-data segments wherein each image-data segment corresponds to a physical sub-region of the light-emission face;

algorithmically analyzing the image-data segments in order to identify the sub-region of the light-emission face through which light is emitted with the lowest average emission intensity, and identifying emission-intensity data associated with that sub-region as reference emission data;

algorithmically analyzing, in accordance with a pre-established parameter set, each image-data segment in order to identify non-compliant sub-regions through which light is emitted with an average intensity exceeding a maximum value pre-established relative to the sub-region associated with the reference emission data;

causing the data processing system to produce and communicate to the scoring device a set of scoring signals instructing the scoring device to score at least a portion of each non-compliant sub-region; and scoring, in response to the scoring signals communicated by the data processing system, each non-compliant sub-region until that sub-region emits light with acceptable average intensity.

10. The method of claim 9 wherein the image data is segmented such that the image-data segments correspond to physical sub-regions extending along light-emission face in two dimensions.

11. The method of claim 10 wherein the image data is segmented in accordance with a method the object of which is to have the image-data segments correspond to sub-regions of equal area, irrespective of variations in fiber density among the sub-regions.

12. The method of claim 9 wherein the image data is segmented in accordance with a method the object of which is to have the image-data segments correspond to sub-regions of equal area, irrespective of variations in fiber density among the sub-regions.

13. A method of calibrating the light-emission intensity of an optical fiber light line assembly including a plurality of constituent optical fibers with light-input ends through which light is introduced into the optical fibers and light-output ends including light-output faces mutually bound to define a light-line light-emission face through which light is emitted, the method comprising:

providing light-line calibration apparatus including a (i) data processing system with an associated computer memory, (ii) a camera communicatively linked to the data processing system, and (iii) a signal-responsive scoring device communicatively linked to the data processing system and being mechanically responsive to instructions programmed into the data processing system;

securing the light-line light-emission face in a fixed position;

introducing light uniformly into the light-input ends of the constituent optical fibers such that light is emitted through the light-output faces defining the light-line light-emission face;

capturing an image of a region of the light-emission face, with light emitting therefrom, and storing image data representative of the image in the computer memory;

segmenting the image data into at least two image-data segments wherein (i) each image-data segment corresponds to a physical sub-region of the imaged region and (ii) each sub-region comprises the light-output face of at least one constituent optical fiber;

associating with each image-data segment an address tag indicative of the spatial location, along the imaged region, of the sub-region to which the associated image-data segment corresponds;

algorithmically analyzing each image-data segment and associating with each image-data segment, in the computer memory, a numeric value indicative of the average intensity with which light is emitted through the sub-region to which that image-data segment corresponds relative to the intensity with which light is emitted through at least one other sub-region within the imaged region;

algorithmically analyzing the image-data segments in order to identify the sub-region of the light-emission face through which light is emitted with the lowest average emission intensity;

pre-establishing, and storing in computer memory, a maximum intensity-deviation value indicative of an amount by which the average emission intensity with which light is emitted in the sub-region through which light is emitted with the highest average emission intensity can exceed the average emission intensity with which light is emitted in the sub-region through which light is emitted with the lowest average emission intensity;

calculating, in association which each sub-region, other than the sub-region associated with the lowest average emission intensity, a sub-region-specific emission-intensity deviation indicative of an amount by which the average emission intensity in that sub-region differs from the average emission intensity in the sub-region associated with the lowest average emission intensity;

identifying each sub-region through which light is emitted with an intensity exceeding the maximum intensity-deviation value; and causing the data processing system to produce and communicative to the scoring device a set of scoring signals instructing the scoring device to score the light-output face of at least one constituent optical fiber within each sub-region through which light is emitted with an emission intensity exceeding the maximum intensity-deviation value until that sub-region emits light with an average intensity not exceeding the maximum intensity-deviation value.

14. The method of claim 13 wherein the sub-regions are defined as sub-portions of approximately equal area along the imaged region of the light-emission face, irrespective of variations in fiber count among the sub-regions.

15. The method of claim 14 wherein the image data is segmented such that the image-data segments correspond to physical sub-regions extending along two dimensions within the imaged region.

16. The method of claim 13 wherein the image data is segmented such that the image-data segments correspond to physical sub-regions extending along two dimensions within the imaged region of the light-emission face.

17. The method of claim 13 wherein the image data is segmented such that the image-data segments correspond to physical sub-regions extending along only a single dimension within the imaged region of the light-emission face.

* * * * *